United States Patent [19]

Flannery et al.

[11] Patent Number: 5,765,038
[45] Date of Patent: Jun. 9, 1998

[54] INTEGRATION OF GROUPWARE WITH THE INTEGRATED QUALITY CONTROL METHODOLOGY VIA FACILITATED WORK SESSIONS

[75] Inventors: Kerin John Flannery, Endicott; Philip David Heinlein, Binghamton; Carl Frank Ingersoll, Endwell; James Allen Martin, Jr., Endicott, all of N.Y.

[73] Assignee: International Business Machines Corporation, Armonk, N.Y.

[21] Appl. No.: 638,400

[22] Filed: Apr. 26, 1996

Related U.S. Application Data

[63] Continuation of Ser. No. 511,764, Aug. 7, 1995, abandoned, which is a continuation of Ser. No. 247,817, May 23, 1994, abandoned, which is a continuation-in-part of Ser. No. 229,967, Apr. 19, 1994, abandoned.

[51] Int. Cl.[6] .................................................. G06F 17/30
[52] U.S. Cl. .................. 395/610; 395/54; 395/500; 395/604; 395/683; 364/552
[58] Field of Search ......................... 395/650, 406, 395/54, 500, 604, 683; 364/552

[56] References Cited

U.S. PATENT DOCUMENTS

| | | | |
|---|---|---|---|
| 4,611,808 | 9/1986 | Palmer | 273/138 A |
| 4,763,277 | 8/1988 | Ashford et al. | 395/65 |
| 5,167,011 | 11/1992 | Priest | 395/54 |
| 5,172,313 | 12/1992 | Schumacher | 364/401 |
| 5,216,592 | 6/1993 | Mann et al. | 364/401 |
| 5,220,657 | 6/1993 | Bly et al. | 395/425 |
| 5,228,137 | 7/1993 | Kleinerman et al. | 398/500 |
| 5,245,554 | 9/1993 | Tsuyama et al. | 364/552 |
| 5,249,135 | 9/1993 | Fujita et al. | 364/474.1 |
| 5,255,181 | 10/1993 | Chapman et al. | 364/401 |
| 5,278,751 | 1/1994 | Adiano et al. | 364/402 |
| 5,369,705 | 11/1994 | Bird et al. | 380/21 |
| 5,423,038 | 6/1995 | Davis | 395/650 |
| 5,504,676 | 4/1996 | Domen et al. | 364/406 |

OTHER PUBLICATIONS

Linda Harasim, "Designs & tools to augment collaborative learning in computerized conferencing systems". IEEE, vol. IV, 1991, pp. 379–385.

Joline Morrison, "Team memory: Information management for business teams", IEEE, vol. IV, 1993, pp. 122–131.

Joseph S. Valacich, et al. "A conceptual framework of anonymity in group support systems". IEEE, vol. IV, 1992, pp. 101–112.

Nunamaker et al., "Collaboration technology face-to-face to the office" IEEE, 1992, pp. 960–967.

*Primary Examiner*—Thomas G. Black
*Assistant Examiner*—Cheryl Lewis
*Attorney, Agent, or Firm*—Michael E. Belk; Douglas M. Clarkson

[57] ABSTRACT

A network application for automatically formatting and printing documents to be used as planning manuals to be used by company personnel for improving quality control. The outputted documents can also be educational manuals for dispersing among organizational personnel common information for integrated strategic planning for quality control improvement. Facilitated collaborative work sessions among work groups inputting and sharing comments and ideas provide starting data to the network application.

8 Claims, 34 Drawing Sheets

OVERALL CONFIGURATION OF SYSTEM

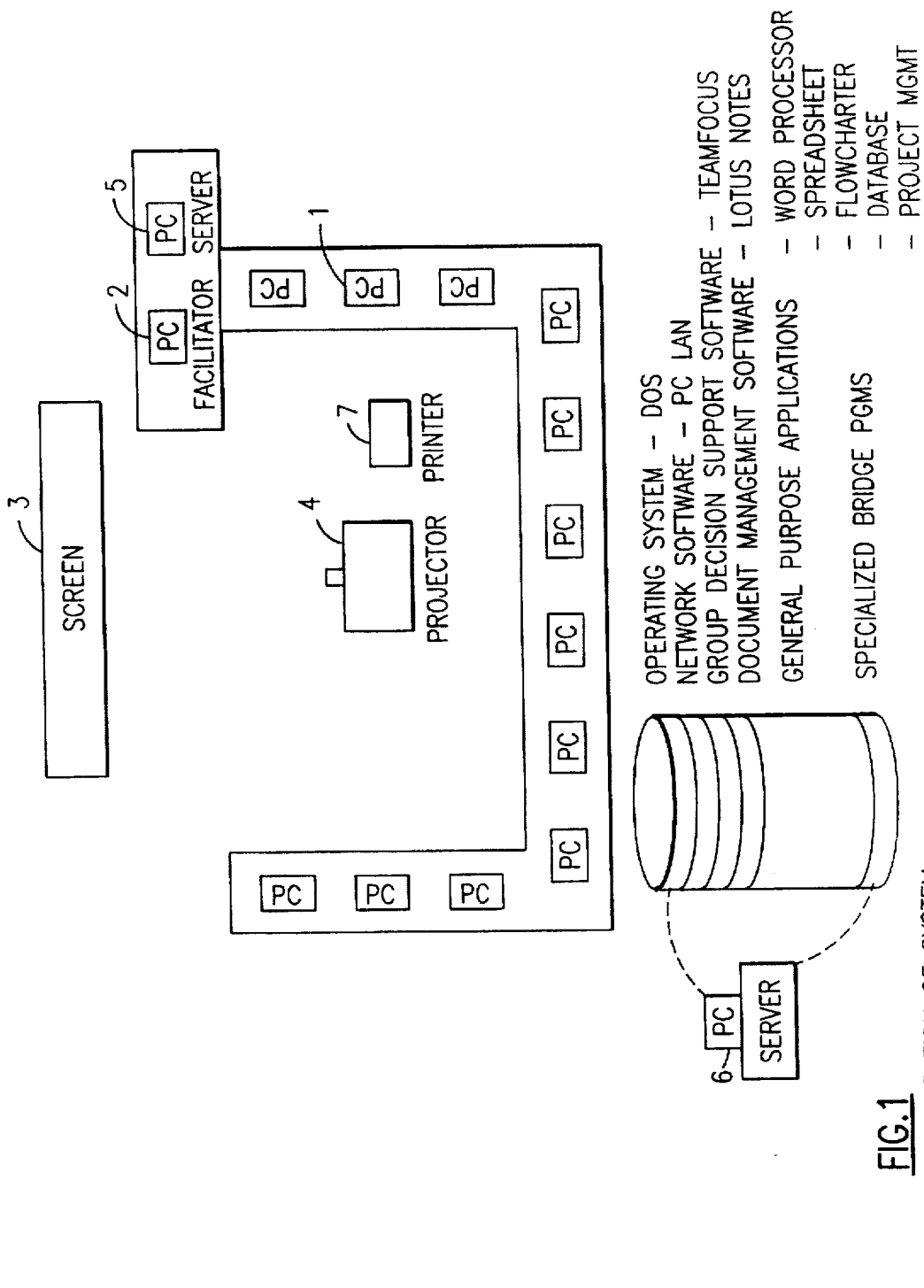

EXAMPLE OF PROCESS DOCUMENTATION

| TABLE 3. PROCESS FLOW TABLE | |
|---|---|
| DESCRIPTION | PROCEDURE |
| TRANSFER | MOVE PRODUCT FROM LAMINATE MACHINING TO PC 647 |
| TRANSFER | MOVE PRODUCT FROM PC 674 TO PC 681 |
| DELAY | STABILIZE AND PRIORITIZE PRODUCT |
| PREPARATION | REDIRECTING WORK FOR DIFFERENT PC'S WIP AND MACHINE LOADING |
| RECORD | RECORD IN THE LOGBOOK PART/JOB NUMBER, PNL QTY AND MAG NUMBER |
| PREPARATION | INPUT DATA INTO SERIES 1 VERIFY OVERLAY, VIEW DATA |
| PREPARATION | LOAD PANELS ACCORDING TO DATA BOOK. ORIENTATION OF THE NOTCH'S THE UPPER LEFT CORNER |
| DELAY | REVERIFY THE DRILL OPERATION AND PROCEDURE |
| OPERATION | DRILL PANELS |
| DELAY | TO CHANGE DRILL YOU MUST; CHECK ALL DRILL FOR PROPER SIZE BEFORE RUNNING, REMOVING EXISTING DRILLS FROM MACHINE AND ALSO REMOVE COLLETS |
| OPERATION | TO UNLOAD MACHINE, REMOVE TAPE FROM MACHINE, REMOVE TOP SHEET CHECK FOR BURRS |

FIG.2A

| FIXTURE/TOOL | PARAMETER / SPECIFICATION | DISTANCE / TIME |
|---|---|---|
| PHYSICAL MOVE (CCIS) | | 1 HR |
| SMART SYSTEM INTERNAL TRUCK | TRAINING PACKAGE | CONT. |
| TEMPERATURE AND HUMIDITY CONTROL CHART RECORDER | TEMPERATURE 68 +/-2 DEG F | 2 HRS |
| SMART SYSTEM | | CONT. |
| LOGBOOK | REFERENCE GUIDE | 1 MIN. |
| DATA BOOK, SERIES 1, OVERLAYS, PROGRAM DATA | | 2 MIN. |
| PRODUCT ROUTING, DRILL BOOK, OPERATOR | REFER TO END6-0515-005 | 15 MIN. |
| PRODUCT ROUTING, DRILL BOOK, DRILL DATA | OPERATOR PROCEDURE SET UP BOOK | 1-2 MIN. |
| STD DRILL BOOK PROCEDURE GUIDE | PRODUCT DEPENDENT | 30MIN / 8 HRS |
| MICROMETER | TOLERANCE: SM HOLES +/-0.0005 I G HOLES +/-.003 | 5MIN / 1HR |
| | REFER TO DEFECT LIST | 5 MIN. |

FIG.2B

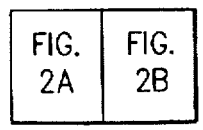

FIG.2

EXAMPLE OF OPPORTUNITIES TABLE

| TABLE 2. OPPORTUNITIES TABLE | | | |
|---|---|---|---|
| OPPORTUNITIES | ENTRY DATE | OWNER | STATUS |
| RAZOR BLADE CHANGES | 4/18/92 | GROUP | CLOSED BATH LE |
| RESIST LOT NUMBERS | 4/18/92 | GROUP | CLOSED |
| LOGBOOK | 4/18/92 | GREG | CLOSED |
| OPEN RESIST ROLL IDENTIFICATION | 4/18/92 | GROUP | CLOSED |
| CLEANING NOT BEING DONE AT LAMINATOR | 4/18/92 | GROUP | CLOSED |
| RUNNING AGED JOBS FIRST | 4/18/92 | GROUP | CLOSED |
| AUTO-LOADER PROBLEMS | 4/18/92 | LARRY/NATE | CLOSED |
| TOO MANY SCRAP PANELS AT LAMINATOR | 6/03/92 | GROUP | CLOSED |
| SPEED CONTROL NOT IN ORDER | 5/20/92 | NATE/SUE | CLOSED |

FIG.3A

| DEPENDENCIES | RESOLUTION | BENEFIT |
|---|---|---|
| OPERATOR AWARENESS | RECORD IN LOGBOOK EVERY 200 PANELS | WSO |
| OPERATOR AWARENESS | RECORD IN LOGBOOK | FIRST PASS YIELDS |
| SET-UP | TRACK CURE ROLL RESIST AND RAZOR CHANGES, DOWN-TIME AND TYPE OF RESIST | WSO |
| DESIGING | LABEL COLLAR WITH TYPE OF RESIST WITH TYVAK LABEL | WSO |
| OPERATORS | TRAM OPERATORS HOW TO CLEAN AT BEGINNING OF EACH SHIFT | QUALITY |
| OPERATOR KNOWLEDGE | FIFO | CYCLE TIME |
| HAVING MADE | INSTALL GUIDES TO HELP LOAD RIGHT | WSO |
| USED FOR SET-UP | MARK PNLS TO BE USED FOR SETUP | WSO |
| USED FOR SET-UP | MARK PNLS TO BE USED FOR SETUP | WSO |

FIG.3B

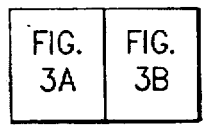

FIG.3

| TABLE 4 (PAGE 1 OF 2) PROCESS QUALITY CONTROL PLAN |||||||||
|---|---|---|---|---|---|---|---|---|
| VARIABLE | SPECIFICATION | N | V | L | T | A | S | C |
| NAPS BATH T<br>Ni BATH T<br>PdNi, AU<br>BATH T | 115 +/- 5C<br>135 +/- 5C<br>130 +/- 5C | | X | | | | | M |
| Ni CONCENTRATION | 135 +/- 15g/l | | | | | X | | |
| Ni Ph | 3.0 - 4.3 | | | | | X | | |
| BORIC ACID | 25 - 38g/l | | | | | X | | |
| Pd CONCENTRATION | 20 +/- 2g/l | | | | | X | | |
| Ni CONCENTRATION | 8.2 - 12g/l | | | | | X | | |
| PdNi RATIO | 1.8 - 2.5g/l | | | | | X | | |
| PdNi pll | 7.6 +/- .4 | | X | | | | | |
| PdNi SG | 1.0211 - 1.0741 | | | | | X | | |
| PdNi BRIGHTENER | 8 +/- 4ml/l | | | | | X | | |
| Au CONCENTRATION | 10.5 - 15g/l | | | | | X | | |
| Au pll | 5.5 - 6.0 | | | | | X | | |
| Au DENSITY | 1.112 - 1.205 | | | | | X | | |
| Ni DRAGOUT | 0 - 100ppm | | | | | X | | |
| THALLIUM | 12 +/- 6ppm | | | | | X | | |
| PERSULFATE | 360 +/- 120gl | | | | | X | | |

EXAMPLE OF PROCESS QUALITY CONTROL PLAN

FIG. 4A(1)

| SAMPLE SIZE | SAMPLE FREQUENCY | Cp | Cpk | MEAN | STD DEV | FMEA | R/P |
|---|---|---|---|---|---|---|---|
| 1 | 4/SHIFT | 2.79<br>2.72<br>2.80 | 1.95<br>2.30<br>2.49 | 114<br>134<br>129 | 0.06<br>0.06<br>0.06 | YES | 1 |
| 5 m/l | 1 DAY | 2.47 | 2.09 | 137 | 2.0 | NO | 3 |
| --- | 1/DAY | 2.49 | 1.20 | 4.0 | 0.09 | YES | 4 |
| 10 m/l | NEW BATH | 1.33 | 0.66 | 35 | 1.6 | NO | 5 |
| 10 m/l | 1/SHIFT | .85 | 0.80 | 20.1 | 0.8 | NO | 6 |
| 10 m/l | 1/SHIFT | 1.28 | 1.23 | 10.2 | 0.5 | NO | 7 |
| 1 | 1/SHIFT | 0.97 | 0.50 | 2.0 | 0.1 | NO | 8 |
| 1 | 1/SHIFT | 0.72 | 0.35 | 7.8 | 0.2 | NO | 9 |
| 100 m/l | 1/SHIFT | 1.56 | 0.02 | 1.070 | 0.006 | NO | 10 |
| D675 | 2/WEEK | 0.74 | 0.53 | 9.12 | 1.8 | NO | 11 |
| 2 m/l | 1/DAY | 1.43 | 1.22 | 12.4 | 0.5 | NO | 12 |
| --- | 1/DAY | 1.08 | 1.00 | 5.8 | 0.08 | NO | 13 |
| 100 m/l | 1/DAY | 2.52 | 2.45 | 1.157 | 0.006 | NO | 14 |
| D675 | 2/MONTH | 0.98 | 0.91 | 53.4 | 17.0 | NO | 15 |
| D675 | 2/WEEK | 1.00 | .32 | 7.9 | 2.0 | NO | 16 |
| 1 ml | NEW BATH | 1.52 | 0.89 | 310 | 26.2 | NO | 2 |

FIG. 4A(2)

| FIG. 4A | FIG. 4A(1) | FIG. 4A(2) |

EXAMPLE OF PRODUCT QUALITY CONTROL PLANS

TABLE 5. PRODUCT QUALITY CONTROL PLAN

| VARIABLE | SPECIFICATION | N | V | L | T | A | S | C | SAMPLE SIZE | SAMPLE FREQ. | Cp | Cpk | MEAN | Std DEV | Fmea | R/P |
|---|---|---|---|---|---|---|---|---|---|---|---|---|---|---|---|---|
| SET UP GOLD THICKNESS | 25 +/- 15 MICROINCHES | | | | | | X | | 4 TABS | 1/SHIFT | 5.60 | 2.52 | 16.7 | 0.9 | YES | 19 |
| SET UP NICKEL THICKNESS | MINIMUM 70 MICROINCHES | | | | | | X | | 4 TABS | 1/SHIFT | 2.21 | 2.21 | 131 | 9 | YES | 20 |
| SET UP PdNi COMPOSITION | 70-85% | | | | | | X | | 4 TABS | 1/SHIFT | 0.58 | 0.49 | 79 | 4.3 | YES | 21 |
| SET UP PdNi THICKNESS | MINIMUM 110 MICROINCHES | | | | | | X | | 4 TABS | 1/SHIFT | 1.11 | 1.11 | 141 | 9 | YES | 22 |
| GOLD THICKNESS | 25 +/- 15 MICROINCHES | | | | | | X | | 4 TABS | 1/HOUR | 2.83 | 1.30 | 16.9 | 1.8 | YES | 23 |

FIG.4B

| TABLE 7. DATA QUALITY CONTROL PLAN | | | | |
|---|---|---|---|---|
| ATTRIBUTE | DESCRIPTION | FORMULA | SAMPLE SIZE | |
| CYCLE TIME | LENGTH OF TIME JOB IS IN PROCESS CENTER | TIME OUT MINUS TIME IN | 100% | |
| MACHINE DOWNTIME | PAPER LOG FOR TRACKING DOWNTIME ON THE PLATER | TOTAL NUMBER OF HOURS EQUIPMENT WAS DOWN | ALL DOWN CALLS | |
| OUTGOING DEFECTS | CHECK FOR SCRAP AND DEFECTIVE PRODUCT | TOTAL # DEFECTS FOUND / # INSPECTED | 100% | |
| YIELDS | A TYPE OF SCRAP REPORTING | TOTAL GOOD PRODUCED / TOTAL SCRAPPED | 100% | |
| SERVICEABILITY | PROCESSING OF PARTS IN THE TIME REQUESTED | DELTA BETWEEN DATE PROMISED & SHIPPED DATE | 100% | |
| MTBF | MECHANICAL PERFORMANCE OF THE LINE | 168 HRS / NUMBER OF DOWN CALL > .3 HOURS | 100% | |
| DAILY GOING RATE | DAILY OUTPUT | TOTAL GOOD MOVED OUT | 100% | |
| MACHINE AVAILABILITY | WAS MACHINE AVAILABLE WHEN NEEDED | TOTAL DOWNTIME TIME (-) UP TIME | 100% | |

EXAMPLE OF DATA QUALITY CONTROL PLAN

| SAMPLE FREQ | INPUT PROCEDURE | ACCESS PROCEDURE | DATA INPUT | DATA BASE |
|---|---|---|---|---|
| ALL JOBS | WRITTEN | WRITTEN | OPERATOR | PATTS |
| 1/SHIFT | VERBAL | VERBAL | OPERATOR | LOGBOOK |
| EVERY JOB | VERBAL | VERBAL | OPERATOR | LOGBOOK |
| 1/WEEK | WRITTEN | WRITTEN | OPERATOR | MTG |
| EVERY JOB | NONE | NONE | OPERATOR | PATTS |
| 1/WEEK | WRITTEN | WRITTEN | OPERATOR | MRS |
| 1/DAY | WRITTEN | WRITTEN | OPERATOR | KC EXEC |
| 1/WEEK | WRITTEN | WRITTEN | OPERATOR | MRS |

| TABLE 8. INFORMATION QUALITY CONTROL PLAN | | | | | |
|---|---|---|---|---|---|
| ATTRIBUTE | TARGET OWNER | SAMPLE SIZE | SAMPLE FREQ | TARGET | TARGET OWNER R/P |
| CYCLE TIME | MANAGERS | ALL PRODUCT | 1/WEEK | .7 DAYS | VERBAL |
| MACHINE DOWNTIME | MAINT, ENG | ALL DOWN CALLS | 1/SHIFT | 1 INCIDENT | DOCUMENTED |
| OUTGOING DEFECTS | MFG | EVERY ORDER | 1/SHIFT | ZERO | VERBAL |
| YIELDS | MFG, ENG | ALL PRODUCT TYPES | 1/WEEK | PROD DEPENDENT | VERBAL |
| SERVICE-ABILITY | BUSINESS UNIT | ALL PRODUCT TYPES | 1/WEEK | 95% | DOCUMENTED |
| MTBF | MAINT, ENG, MFG | ALL DOWN CALLS | 1/WEEK | 202 HRS | DOCUMENTED |
| DGR (DAILY GOING RATE) | MFG | ALL PRODUCT | 1/SHIFT | DEMAND DEPEN. | VERBAL |
| MACHINE AVAILABILITY | MAINT, ENG | ALL DOWN CALLS | 1/WEEK | 85% | DOCUMENTED |

EXAMPLE OF INFORMATION QUALITY CONTROL PLAN

| INTERNAL EFFECT | INTERNAL RP OWNER AND DOCUMENTATION |
|---|---|
| INCREASE COST | WRITTEN (1) |
| INCREASE CYCLE TIME, MISS SERVICEABILITY & DAILY GOING RATE | WRITTEN (2) |
| DECREASE YIELDS, INCREASE COST OF PRODUCT | WRITTEN (3) |
| INCREASES COST OF PRODUCT, DRIVES HEADCOUNT, MISS COMMITMENTS | WRITTEN (4) |
| INCREASE COST OF PRODUCT, DRIVES HEADCOUNT, MISS COMMITMENTS | WRITTEN (5) |
| INCREASES COST OF PRODUCT, MISS SERVICEABILITY | WRITTEN (6) |
| INCREASES COST OF PRODUCT, MISS SERVICEABILITY | WRITTEN (7) |
| INCREASES COST OF PRODUCT, MISS SERVICEABILITY | WRITTEN (2) |

| TABLE 6 (PAGE 1 OF 2). GAGE QUALITY CONTROL PLAN ||||||
|---|---|---|---|---|---|
| VARIABLE | SENSOR | ADJUSTMENT OWNER | CONTROL | DISPLAY | |
| NaPs BATH TEMP | THERMOCP | OPERATOR | CLOSED LOOP | DIGITAL | |
| Ni BATH TEMP | THERMOCP | OPERATOR | CLOSED LOOP | DIGITAL | |
| PdNi, Au BATH TEMP | THERMOCP | OPERATOR | CLOSED LOOP | DIGITAL | |
| Ni CONCEN-TRATION | LIGHT | OPERATOR | OPEN LOOP | DIGITAL | |
| Ni Ph | PROBES | OPERATOR | OPEN LOOP | DIGITAL | |
| BORIC ACID | CLR CHNG | OPERATOR | OPEN LOOP | BURET | |
| Pd CONCEN-TRATION | LIGHT | ENGINEERING | OPEN LOOP | DIGITAL | |
| Ni CONCEN-TRATION | LIGHT | ENGINEERING | OPEN LOOP | DIGITAL | |
| PdNi RATIO | LIGHT | ENGINEERING | OPEN LOOP | DIGITAL | |
| PdNi pll | PROBES | OPERATOR | OPEN LOOP | DIGITAL | |
| PdNi SG | HYDROMTR | OPERATOR | OPEN LOOP | SCALE | |
| PdNi BRIGHTENER | CHROMO | ENGINEERING | OPEN LOOP | SCALE | |
| AU CONCEN-TRATION | LIGHT | ENGINEERING | OPEN LOOP | SCALE | |
| Ph | PROBES | OPERATOR | OPEN LOOP | SCALE | |

EXAMPLE OF GAGE QUALITY CONTROL PLAN

| CALIBRATION OWNER | CALIBRATION METHOD | CALIBRATION FREQUENCY | CALIBRATION ACCURACY | PROC. |
|---|---|---|---|---|
| MNT D510 | TEMP PROBE | AS REQUIRED | 99% | YES |
| MNT D510 | TEMP PROBE | AS REQUIRED | 99% | YES |
| MNT D510 | TEMP PROBE | AS REQUIRED | 99% | YES |
| LAB 675 | TITRATION | 4/YEAR | .3g/l | YES |
| MFG 316 | BUFFER | 1/DAY | 0.01 | YES |
| MFG 316 | TITRATION | --- | 0.1g/l | YES |
| LAB 675 | STANDARD | 4/YEAR | 0.3g/l | YES |
| LAB 675 | STANDARD | 4/YEAR | 0.3g/l | YES |
| LAB 675 | STANDARD | 4/YEAR | 0.3g/l | YES |
| Mnt 489 | STANDARD | 4/YEAR | 0.01 | YES |
| LAB 675 | Di WATER | 1/WEEK | 0.0002 | YES |
| LAB 675 | STANDARD | 1/WEEK | 0.01ml/l | YES |
| LAB 675 | STANDARD | 4/YEAR | 0.3g/l | YES |
| MFG 316 | BUFFER | 1/DAY | 0.01 | YES |

FIG. 4E(2)

| FIG. 4E | FIG. 4E(1) | FIG. 4E(2) |
|---|---|---|

EQUIPMENT MAINTENANCE QUALITY CONTROL PLAN

| MAJOR ASSEMBLY OR COMPONENT | IDENTIFICATION NAME OR NUMBER | N | B | S | P | M | FAILURE TYPE | REACTION PLAN | MTBF | MTTR | IMPROVE PLAN | FMEA | MAINTENANCE PERFORMED BY |
|---|---|---|---|---|---|---|---|---|---|---|---|---|---|
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

N=NONE   B=BREAKDOWN   S=SCHEDULED   P=PREVENTATIVE   M=PREDICTIVE

FIG. 4F

PROCESS INDEX — xxxxxxxxxxxxxxxxxxxxxxxx

| POINTS | PARAMETER | MATRIX | AVAILABLE POINTS | VARIABLE COUNT | POINTS |
|---|---|---|---|---|---|
| 200 | SPECIFY | NONE | 0 | xxx | xxx |
|  |  | POINT | 40 | xxx | xxx |
|  |  | RANGE | 120 | xxx | xxx |
|  |  | NOMINAL/TOLERANCE | 200 | xxx | xxx |
| 100 | SAMPLE | NONE | 0 | xxx | xxx |
|  |  | AS REQUIRED | 40 | xxx | xxx |
|  |  | SCHEDULED | 100 | xxx | xxx |
| 250 | CONTROL | NONE | 0 | xxx | xxx |
|  |  | VISUAL | 20 | xxx | xxx |
|  |  | LOG | 80 | xxx | xxx |
|  |  | TREND | 120 | xxx | xxx |
|  |  | ACTION | 160 | xxx | xxx |
|  |  | ACTION (NON-SPC) | 250 | xxx | xxx |
|  |  | SPC | 250 | xxx | xxx |
|  |  | ANY WITH CONDITIONS MET | 250 | xxx | xxx |
| 200 | CAPABLE | NONE | 0 | xxx | xxx |
|  |  | BASELINE | 200 | xxx | xxx |
| 250 | REACTION PLAN | DOCUMENT |  | xxx | xxx |
|  |  | NONE | 0 | xxx | xxx |
|  |  | VERBAL | 20 | xxx | xxx |
|  |  | WRITTEN | 80 | xxx | xxx |
|  |  | CONTROLLED | 100 | xxx | xxx |
|  |  | OWNER |  | xxx | xxx |
|  |  | NONE | 0 | xxx | xxx |
|  |  | ENGINEERING | 20 | xxx | xxx |
|  |  | MAINTENANCE | 50 | xxx | xxx |
|  |  | MFG SPECIALIST | 100 | xxx | xxx |
|  |  | OPERATOR | 150 | xxx | xxx |
| 1000 |  |  |  | xxx | xxx |

POINTS = (VARIABLE COUNT / TOTAL VARIABLES) x AVAILABLE POINTS

FIG.5A

PRODUCT INDEX – xxxxxxxxxxxxxxxxxxxxxxxxx

| POINTS | PARAMETER | MATRIX | AVAILABLE POINTS | VARIABLE COUNT | POINTS |
|---|---|---|---|---|---|
| 200 | SPECIFY | NONE<br>POINT<br>RANGE<br>NOMINAL/TOLERANCE OR MINIMUM/MAXIMUM | 0<br>40<br>120<br>200 | xxx<br>xxx<br>xxx<br>xxx | xxx<br>xxx<br>xxx<br>xxx |
| 100 | SAMPLE | NONE<br>AS REQUIRED<br>SCHEDULED | 0<br>40<br>100 | xxx<br>xxx<br>xxx | xxx<br>xxx<br>xxx |
| 250 | OPERATOR CONTROL<br><br>(SEE CONTROL MATRIX) | NONE<br>VISUAL<br>LOG<br>TREND<br>ACTION<br>ACTION (NON-SPC)<br>SPC<br>ANY WITH CONDITIONS MET | 0<br>20<br>80<br>120<br>160<br>250<br>250<br>250 | xxx<br>xxx<br>xxx<br>xxx<br>xxx<br>xxx<br>xxx<br>xxx | xxx<br>xxx<br>xxx<br>xxx<br>xxx<br>xxx<br>xxx<br>xxx |
| 200 | CAPABLE | NONE<br>< 1.5<br>> 1.5 | 0<br>100<br>200 | xxx<br>xxx | xxx<br>xxx |
| 250 | REACTION PLAN | DOCUMENT<br>  NONE<br>  VERBAL<br>  WRITTEN<br>  CONTROLLED<br><br>OWNER<br>  NONE<br>  ENGINEERING<br>  MAINTENANCE<br>  MFG SPECIALIST<br>  OPERATOR | <br>0<br>20<br>80<br>100<br><br>0<br>20<br>50<br>100<br>150 | xxx<br>xxx<br>xxx<br>xxx<br>xxx<br><br>xxx<br>xxx<br>xxx<br>xxx<br>xxx | xxx<br>xxx<br>xxx<br>xxx<br>xxx<br><br>xxx<br>xxx<br>xxx<br>xxx<br>xxx |
| 1000 | | | | xxx | xxx |

POINTS = (VARIABLE COUNT / TOTAL VARIABLES) x AVAILABLE POINTS

FIG.5B

DATA INDEX – xxxxxxxxxxxxxxxxxxxxxxxxx

| POINTS | PARAMETER | MATRIX | AVAILABLE POINTS | VARIABLE COUNT | POINTS |
|---|---|---|---|---|---|
| 100 | DESCRIPTION | UNKNOWN<br>VERBAL<br>WRITTEN<br>CONTROLLED | 0<br>20<br>80<br>100 | xxx<br>xxx<br>xxx<br>xxx | xxx<br>xxx<br>xxx<br>xxx |
| 100 | FORMULA | UNKNOWN<br>VERBAL<br>WRITTEN<br>CONTROLLED | 0<br>20<br>80<br>100 | xxx<br>xxx<br>xxx | xxx<br>xxx<br>xxx |
| 100 | SAMPLING | UNKNOWN<br>AS REQUIRED<br>SCHEDULED | 0<br>40<br>100 | xxx<br>xxx<br>xxx | xxx<br>xxx<br>xxx |
| 200 | INPUT PROCEDURE | NONE / UNKNOWN<br>VERBAL<br>WRITTEN<br>CONTROLLED | 0<br>40<br>160<br>200 | xxx<br>xxx<br>xxx<br>xxx | xxx<br>xxx<br>xxx<br>xxx |
| 200 | DATA INPUT | NONE / UNKNOWN<br>OPERATOR<br>AUTOMATIC | 0<br>100<br>200 | xxx<br>xxx<br>xxx | xxx<br>xxx<br>xxx |
| 200 | ACCESS PROCEDURE | NONE / UNKNOWN<br>VERBAL<br>WRITTEN<br>CONTROLLED | 0<br>40<br>160<br>200 | xxx<br>xxx<br>xxx<br>xxx | xxx<br>xxx<br>xxx<br>xxx |
| 100 | DATA STORAGE | UNKNOWN<br>KNOWN | 0<br>100 | xxx<br>xxx | xxx<br>xxx |
| 1000 | | | | xxx | xxx |

POINTS = (VARIABLE COUNT / TOTAL VARIABLES) x AVAILABLE POINTS

FIG.5C

INFORMATION INDEX – xxxxxxxxxxxxxxxxxxxxxxxxx

| POINTS | PARAMETER | MATRIX | AVAILABLE POINTS | VARIABLE COUNT | POINTS |
|---|---|---|---|---|---|
| | | | | | |
| 100 | TARGET OWNER | NONE<br>KNOWN | 0<br>100 | xxx<br>xxx | xxx<br>xxx |
| 200 | SAMPLING | NONE<br>AS REQUIRED<br>SCHEDULED | 0<br>80<br>200 | xxx<br>xxx<br>xxx | xxx<br>xxx<br>xxx |
| 100 | TARGET | NONE<br>KNOWN | 0<br>100 | xxx<br>xxx | xxx<br>xxx |
| 150 | TARGET OWNER REACTION PLANS | NONE<br>VERBAL<br>WRITTEN<br>DOCUMENTED<br>N/A | 0<br>40<br>120<br>150<br>150 | xxx<br>xxx<br>xxx<br>xxx<br>xxx | xxx<br>xxx<br>xxx<br>xxx<br>xxx |
| 200 | INTERNAL EFFECT | NONE<br>VERBAL<br>WRITTEN<br>CONTROLLED | 0<br>40<br>160<br>200 | xxx<br>xxx<br>xxx<br>xxx | xxx<br>xxx<br>xxx<br>xxx |
| 250 | INTERNAL REACTION PLANS | DOCUMENT<br>  NONE<br>  VERBAL<br>  WRITTEN<br>  CONTROLLED<br><br>OWNER<br>  NONE<br>  ENGINEERING<br>  MAINTENANCE<br>  MFG SPECIALIST<br>  OPERATOR | <br>0<br>50<br>120<br>150<br><br><br>0<br>20<br>40<br>80<br>100 | <br>xxx<br>xxx<br>xxx<br>xxx<br><br><br>xxx<br>xxx<br>xxx<br>xxx<br>xxx | <br>xxx<br>xxx<br>xxx<br>xxx<br><br><br>xxx<br>xxx<br>xxx<br>xxx<br>xxx |
| | | | | | |
| 1000 | | | | xxx | xxx |

POINTS = (VARIABLE COUNT / TOTAL VARIABLES) x AVAILABLE POINTS

FIG.5D

GAGE INDEX — xxxxxxxxxxxxxxxxxxxxxxxx

| POINTS | PARAMETER | MATRIX | AVAILABLE POINTS | VARIABLE COUNT | POINTS |
|---|---|---|---|---|---|
| 100 | SENSOR | NONE<br>KNOWN | 0<br>100 | xxx<br>xxx | xxx<br>xxx |
| 100 | ADJUSTMENT OWNER | NONE<br>ENGINEERING<br>MAINTENANCE<br>MFG SPECIALIST<br>OPERATOR | 0<br>40<br>60<br>80<br>100 | xxx<br>xxx<br>xxx<br>xxx<br>xxx | xxx<br>xxx<br>xxx<br>xxx<br>xxx |
| 100 | MACHINE CONTROL | NONE<br>OPEN LOOP<br>CLOSED LOOP<br>REAL-TIME MONITORING | 0<br>60<br>80<br>100 | xxx<br>xxx<br>xxx<br>xxx | xxx<br>xxx<br>xxx<br>xxx |
| 100 | DISPLAY | NONE<br>TRANSIENT<br>PERMANENT | 0<br>50<br>100 | xxx<br>xxx<br>xxx | xxx<br>xxx<br>xxx |
| 200 | CALIBRATION OWNER | NONE<br>ENGINEERING<br>MAINTENANCE<br>MFG SPECIALIST<br>OPERATOR | 0<br>50<br>100<br>150<br>200 | xxx<br>xxx<br>xxx<br>xxx<br>xxx | xxx<br>xxx<br>xxx<br>xxx<br>xxx |
| 50 | CALIBRATION METHOD | NONE<br>KNOWN | 0<br>50 | xxx<br>xxx | xxx<br>xxx |
| 100 | CALIBRATION FREQUENCY | NONE<br>AS REQUIRED<br>SCHEDULED | 0<br>50<br>100 | xxx<br>xxx<br>xxx | xxx<br>xxx<br>xxx |
| 50 | CALIBRATION ACCURACY | NONE<br>KNOWN | 0<br>50 | xxx<br>xxx | xxx<br>xxx |
| 200 | CALIBRATION PROCEDURE | NONE<br>VERBAL<br>WRITTEN<br>CONTROLLED | 0<br>50<br>100<br>200 | xxx<br>xxx<br>xxx<br>xxx | xxx<br>xxx<br>xxx<br>xxx |
| 1000 | | | | xxx | xxx |

POINTS = (VARIABLE COUNT / TOTAL VARIABLES) x AVAILABLE POINTS

FIG.5E

EQUIPMENT MAINTENANCE INDEX – MACHINE x

| POINTS | PARAMETER | MATRIX | AVAILABLE POINTS | VARIABLE COUNT | POINTS |
|---|---|---|---|---|---|
| 100 | EQUIPMENT UNIQUELY IDENTIFIED | NONE<br>SPECIFIED | 0<br>100 | xxx<br>xxx | xxx<br>xxx |
| 250 | MAINTENANCE STRATEGY | NONE<br>BREAKDOWN<br>SCHEDULED<br>PREVENTATIVE<br>PREDICTIVE | 0<br>50<br>100<br>175<br>250 | xxx<br>xxx<br>xxx<br>xxx<br>xxx | xxx<br>xxx<br>xxx<br>xxx<br>xxx |
| 150 | FAILURE TYPE CATEGORIZED | NONE<br>SPECIFIED | 0<br>150 | xxx<br>xxx | xxx<br>xxx |
| 200 | CAPABILITY MTTR/MTBF | NONE<br>ESTIMATED | 0<br>200 | xxx<br>xxx | xxx<br>xxx |
| 200 | REACTION PLAN | NONE<br>VERBAL<br>WRITTEN<br>CONTROLLED | 0<br>80<br>160<br>200 | xxx<br>xxx<br>xxx<br>xxx | xxx<br>xxx<br>xxx<br>xxx |
| 100 | IMPROVEMENT PLAN | NONE<br>DOCUMENTED<br>FOLLOWED | 0<br>50<br>100 | xxx<br>xxx<br>xxx | xxx<br>xxx<br>xxx |
| 1000 | | | | xxx | xxx |

POINTS = (VARIABLE COUNT / TOTAL VARIABLES) x AVAILABLE POINTS

FIG.5F

PROCESS VARIABLES REACTION PLAN FOR 055 LAMINATION PRESSES

| PARAMETER | SPECIFICATION | DETECTION |
|---|---|---|
| COLD PLATEN TEMPERATURE | 125 F MAXIMUM | 1) PS2 MOD. 80 WITH PLANTWORKS SOFTWARE 2) THE "LOADER IN" FUNCTION WILL BE DISABLED IF PLATEN #16 IS ABOVE 125 F |
| DWELL TIME | 66 +/- 6 MINUTES | PS2 MOD. 80 WITH PLANTWORKS SOFTWARE |
| COOL DOWN TIME | 48 MINUTES MINIMUM | PS2 MOD. 80 WITH PLANTWORKS SOFTWARE |
| DWELL TEMPERATURE HEAT UP TIME | 10 MINUTES MAXIMUM | PS2 MOD. 80 WITH PLANTWORKS SOFTWARE |

FIG.6A

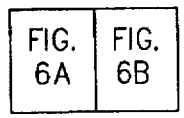

FIG.6

| REACTION PLAN |
|---|
| 1) RUN A DUMMY LOAD ON CYCLE 90. (27 MINUTE COOLDOWN CYCLE)<br>2) IF THE SAME THING REPEATS ON THE NEXT LOAD, CONTACT MAINTENANCE DEPT. 509 (NOT A DOWN CALL) TO DETERMINE IF THE TEMPERATURE RISE WAS CAUSED BY A LEAKING STEAM VALVE OR IF THE BABYSITTING VALVE NEEDS CALIBRATION |
| IF THE DWELL TIME IS U.L.L., (< 60 MINUTES):<br>1) CONTACT M.E. AND Q.E. FOR DISPOSITIONING<br>IF THE DWELL TIME IS O.H.L., (> 72 MINUTES) AND THE PRESS WILL NOT GO INTO COOLDOWN:<br>1) CHECK THE MONITORS FOR TEMP., TIME, AND PRESSURE<br>2) CHECK THE WATER SUPPLY LIGHT<br>3) MANUALLY DROP THE PRESS<br>4) RESET TO COOLDOWN CYCLE (90) AND HIT CYCLE START<br>5) RUN A DUMMY LOAD BEFORE RUNNING ANOTHER PRODUCTION LOAD |
| 1) DETERMINE THE CAUSE FOR THE SHORTENED COOLDOWN CYCLE. EXAMPLE...POWER OUTAGE, MACHINE MALFUNCTION<br>2) RESET TO COOLDOWN CYCLE (90) AND HIT CYCLE START |
| 1) ALL BOOKS NOT RECIEVING ADEQUATE HEAT SHOULD BE REJECTED.<br>2) CONTACT M.E. AND Q.E. FOR DISPOSITIONING |

FIG.6B

SCOPE EXERCISE

```
┌─────────────────────────────────────────────────┐
│ DEFINE THE PROCESS AND SET BOUNDS               │
│ (i.e. BEGINS WITH..., ENDS WITH...).            │
└─────────────────────────────────────────────────┘
                        │
┌─────────────────────────────────────────────────┐
│ USE TEAMFOCUS IDEA ORGANIZATION OR GROUP OUTLINER│
│ TO BRAINSTORM CUSTOMERS AND SUPPLIERS OF THE    │
│ PROCESS. ALLOW EACH PARTICIPANT TO IDENTIFY     │
│ CUSTOMERS AND SUPPLIERS. REVIEW THEIR RESPONSES │
│ AND CONSOLIDATE THEM INTO A LIST.               │
│ GAIN CONSENSUS FROM THE GROUP.                  │
└─────────────────────────────────────────────────┘
                        │
┌─────────────────────────────────────────────────┐
│ USE TEAMFOCUS IDEA ORGANIZATION OR GROUP OUTLINER│
│ COMMENT SECTION TO DOCUMENT ADDITIONAL INFORMATION│
│ REGARDING EACH CUSTOMER AND SUPPLIER:           │
│     -DEFINITION                                 │
│     -PROCESS INPUTS (FROM SUPPLIERS)            │
│     -PROCESS OUTPUTS (TO CUSTOMERS)             │
└─────────────────────────────────────────────────┘
                        │
┌─────────────────────────────────────────────────┐
│ SAVE TEAMFOCUS SESSION OUTPUT TO DISKETTE.      │
│ LOAD SESSION OUTPUT INTO A DATABASE TOOL FOR    │
│ STORAGE AND RETRIEVAL.                          │
└─────────────────────────────────────────────────┘
```

FIG.7

QUALITY CONTROL PLAN AND INDEX DEVELOPMENT SESSION

USE TEAMFOCUS IDEA ORIGANIZATION OR GROUP OUTLINER TO BRAINSTORM THE APPROPRIATE VARIABLES IN THE QUALITY CONTROL PLAN:
    FOR PROCESS QCP - PROCESS VARIABLES
        PRODUCT QCP - PROCESS VARIABLES
        DATA QCP - QUALITY MEASUREMENTS
        INFO QCP - QUALITY MEASUREMENTS
        GAGE QCP - PROCESS OR PRODUCT VARIABLES
        EQUIP QCP - EQUIPMENT COMPONENTS

↓

REVIEW RESPONSES OF THE PARTICIPANTS AND CONSOLIDATE THEM INTO A LIST OF VARIABLES. GAIN CONSENUS FROM THE GROUP

↓

USE TEAMFOCUS IDEA ORGANIZATION OR GROUP OUTLINER COMMENT SECTION TO DOCUMENT ADDITIONAL INFORMATION REGARDING EACH VARIABLE. THE INFORMATION WILL VARY DEPENDING ON THE TYPE OF QUALITY CONTROL PLAN.

↓

SAVE THE TEAMFOCUS SESSION OUTPUT TO DISKETTE.

↓

LOAD THE SESSION OUTPUT INTO A WORD PROCESSOR TOOL AND CREATE THE QUALITY CONTROL PLAN DOCUMENT.

↓

STORE THE QUALITY CONTROL PLAN IN A DOCUMENT MANAGEMENT TOOL FOR REVIEW AND ACCESS BY ALL APPROPRIATE PERSONNEL

↓

LOAD THE SESSION OUTPUT INTO A DATABASE OR SPREADSHEET TOOL. CALCULATE THE NUMBER OF VARIABLES THAT MATCH EACH PERFORMANCE LEVEL IN THE MATRIX SECTION OF THE CORRESPONDING INDEX. CALCULATE THE POINTS ASSIGNED TO EACH PARAMETER IN THE INDEX.

↓

LOAD THE NUMBER OF VARIABLES AND POINTS ASSIGNED INTO A WORD PROCESSOR TOOL AND CREATE THE INDEX DOCUMENT.

↓

STORE THE INDEX DOCUMENT IN A DOCUMENT MANAGEMENT TOOL FOR REVIEW AND ACCESS BY ALL APPROPRIATE PERSONNEL.

FIG.9

REACTION PLAN DEVELOPMENT SESSION

```
USE TEAMFOCUS IDEA ORGANIZATION OR GROUP OUTLINER TO
BRAINSTORM THE APPROPRIATE VARIABLES IN THE REACTION PLAN:
    FOR PROCESS RP  - PROCESS VARIABLES (REF PROCESS QCP)
    FOR PRODUCT RP  - PROCESS VARIABLES (REF PRODUCT QCP)
    FOR DATA RP     - QUALITY MEASUREMENTS (REF DATA QCP)
    FOR INFO RP     - QUALITY MEASUREMENTS (REF INFO QCP)
    FOR GAGE RP     - PROCESS OR PRODUCT VARIABLES
                      (REF PROC/PROD QCP)
    FOR EQUIP RP    - EQUIPMENT COMPONENTS (REF EQUIP QCP)
```

↓

REVIEW RESPONSES OF THE PARTICIPANTS AND CONSOLIDATE THEM INTO A LIST OF VARIABLES. GAIN CONSENUS FROM THE GROUP

↓

USE TEAMFOCUS IDEA ORGANIZATION OR GROUP OUTLINER COMMENT SECTION TO DOCUMENT ADDITIONAL INFORMATION REGARDING EACH VARIABLE- SPECIFICATION, MODE OF DETECTION, AND REACTION PLAN. IF DIFFERENT, REACTION PLAN SHOULD ADDRESS BOTH EXCEEDING THE UPPER LIMIT AND LOWER LIMIT OF THE SPECIFICATION FOR THE VARIABLE.

↓

SAVE THE TEAMFOCUS SESSION OUTPUT TO DISKETTE AND/OR DATABASE.

↓

LOAD THE SESSION OUTPUT INTO A WORD PROCESSOR TOOL AND CREATE THE REACTION PLAN DOCUMENT.

↓

STORE THE REACTION PLAN IN A DOCUMENT MANAGEMENT TOOL FOR REVIEW AND ACCESS BY ALL APPROPRIATE PERSONNEL.

FIG.10

EXPORT – EXPORT UTILITY FROM GROUPWARE TO DBASE III DATABASE (1) PROMPT USER FOR PATH TO SESSION INFORMATION FILE AND VERIFY THAT IT EXISTS
(2) FILL A LIST BOX WITH EACH SESSION NAME AVAILABLE
(3) SET DEFAULT SOURCE AND DESTINATION PATHS AS CURRENT DIRECTORY
(4) VERIFY USER SELECTIONS
(5) OPEN THE OUTPUT DATABASE FILE
(6) READ THE FIRST RECORD FROM THE ITEM LIST FILE AND ASSIGN TO IDEA
(7) AS LONG AS THERE ARE RECORDS IN THE INPUT FILE, DO THE FOLLOWING:
(8) READ THE NEXT LINE AND ASSIGN VALUE TO COMMENT FILE VARIABLE
(9) IF COMMENT FILE EXISTS THEN DO THE FOLLOWING:
(10) READ RECORD FROM COMMENT FILE
(11) COMMENT = COMMENT FILE RECORD
(12) AS LONG AS THERE ARE RECORDS, DO THE FOLLOWING:
(13) READ RECORD FROM COMMENT FILE
(14) APPEND CARRIAGE RETURN CHARACTER, LINE FEED CHARACTER, AND COMMENT FILE RECORD TO COMMENT
(15) LOOP BACK TO STEP (12)
(16) WRITE RECORD TO DATABASE FILE
(17) READ THE NEXT LINE FROM ITEM LIST FILE AND ASSIGN TO IDEA
(18) 
(19) LOOP BACK TO STEP (7)
(20) EXIT THE PROGRAM

FIG.11

INTEGRATION OF GROUPWARE WITH THE INTEGRATED QUALITY CONTROL METHODOLOGY VIA FACILITATED WORK SESSIONS

The application is a continuation of application Ser. No. 08/511,764, filed Aug. 7, 1995, which is a continuation of 08/247,817, filed May 23, 1994, which is now abandoned.

CROSS REFERENCE TO RELATED APPLICATIONS

This application claims priority under 35 U.S.C. § 120 as a continuation-in-part application of U.S. patent application Ser. No. 08/229,967, filed Apr. 19, 1994, entitled "The Application of GroupWare to ISO 9000 Registration via Facilitated Work Sessions" and now abandoned.

U.S. patent applications Ser. No. 08/248,617, entitled "The Integration of GroupWare with Activity Based Management via Facilitated Work Sessions", and Ser. No. 08/248,616, entitled "The Integration of GroupWare with the Quality Function Deployment Methodology via Facilitated Work Sessions", filed concurrently herewith and now abandoned, are assigned to the same assignee hereof and contains subject matter related, in certain respect, to the subject matter of the present application. The above-identified patent applications are incorporated herein by reference.

BACKGROUND OF THE INVENTION

1. Field of the Invention

This invention relates to a computer network application for sharing, combining, formatting, and printing into a predetermined document format information gathered from a number of users or work groups formed within an organization to improve quality control. The application is implemented in a networked, multi-user environment. In particular, this invention effectuates the documentation of an organization's quality baseline model via facilitated, computer-based, cooperative work sessions, thereby streamlining the improvement process for its quality control plans.

2. Description of the Prior Art

The Integrated Quality Control (IQC) methodology is a difficult and time-consuming process for any organization. The typical approach is to assign groups of people to the IQC deliverables. However, a lack of tools means excessive resource and time is spent before the organization has its quality baseline completed. Facilitated work sessions using GroupWare tools were developed in response to this need.

SUMMARY OF THE INVENTION

This invention comprises a network application for manipulating information gathered in a multi-user collaborative environment in order to conduct Integrated Quality Control sessions. The information gathered in the multi-user environment includes input such as comments and ideas from the process improvement team members. These are input into computer storage to be accessed by special programs for formatting and printing in predefined formats. GroupWare tools allow the team members to quickly organize their ideas, reach consensus, and make decisions. Process flows, opportunity tables, quality control plans, reaction plans, and indices are programmed for automatic output. User intervention is unnecessary after the information gathering session and before the printing of the documents, which takes place immediately and automatically.

The initial facilitated work sessions document the organization's manufacturing process flows. After that, the other facilitated work sessions develop the reaction plans and quality control plans. Opportunities are documented at any time during any of the facilitated work sessions. The indices provide a scorecard to measure the organization's quality level and serve as a benchmark for continuous improvement.

The participants in the information gathering sessions are prompted to identify the steps in a manufacturing process or opportunities for improvement. Networked PC's and workstations facilitate the information gathering among the work groups, group editing of the data gathered, and group approval of the final edited group responses. Commercially available group decision support tools fit very well with these information gathering sessions. Commercially available database tools work well for storage of and access to the data that is collected in these information gathering sessions. Commercially available word processors and flowcharting tools can further manipulate the data collected into other useful formats. Specialized bridge programs automate the manipulation and movement of data between these various tools.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a representation of the overall system configuration and the various applications available on the file server.

FIG. 2 is a sample process document.

FIG. 3 is a sample opportunity table.

FIGS. 4a-f are sample quality control plans.

FIGS. 5a-f are sample indices.

FIG. 6 is a sample reaction plan.

FIG. 7 is a functional flowchart of the session for documenting the scope.

FIG. 9 is a functional flowchart of the session for developing quality control plans and indices.

FIG. 10 is a functional flowchart of the session for developing reaction plans.

FIG. 11 is a pseudocode implementation of the TeamFocus Export bridge program.

DESCRIPTION OF THE PREFERRED EMBODIMENT

Overview

Figure 8:
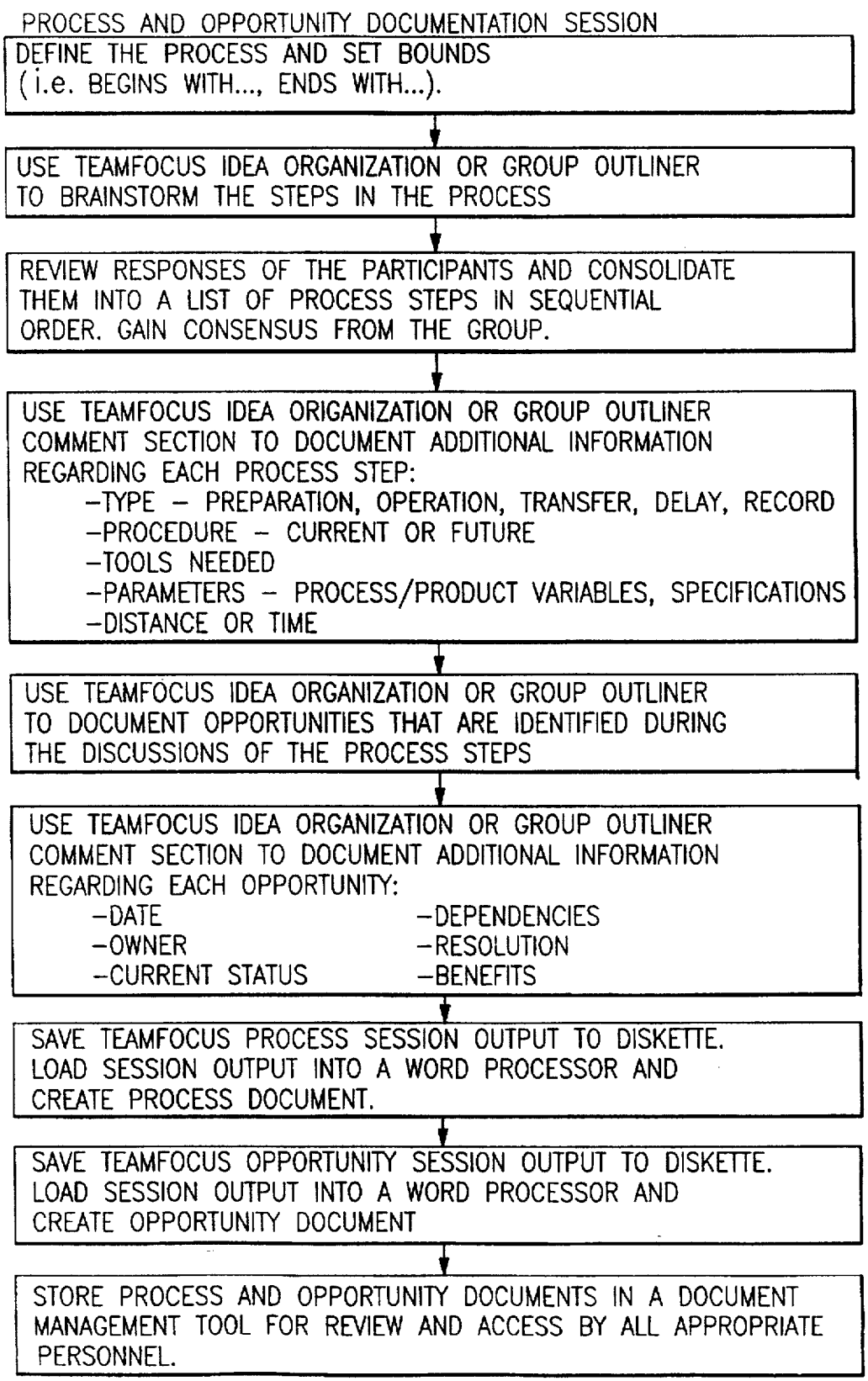
FIG. 8 is a functional flowchart of the session for documenting processes and opportunities.

Integrated Quality Control is a difficult and time-consuming process for any organization trying to document process flows and establish baseline metrics. The typical approach is to assign groups of people to the IQC deliverables. However, a lack of tools means excessive resource and time is spent before the organization has its quality baseline completed. The "process improvement teams" go about the task of documenting process flows, reaction plans, and quality control plans in the traditional manner, which requires many iterations and reviews before the final version is complete. Without GroupWare tools, taking notes during the session often slows the entire process down as the scribe must make sure everything written down is accurate.

Teambuilding and consensus are required for the "process improvement teams" to really be successful. This is difficult to achieve without GroupWare tools and a strong facilitator. Quite often, one or two people dominate the discussion during a session. As a result, valuable information is suppressed and fewer team members "buy in" to the IQC methodology.

Outside of the sessions, other problems arise. The facilitator has to take time to prepare all of the documentation from notes taken during the session. In addition, the process flows and reaction plans must be made available to the appropriate people within the organization. Furthermore, these documents can easily get out of date if they are not updated as procedures change. Document control is essential to ensure everyone is operating from the correct version.

This invention provides a more efficient means to collect and organize the data captured during Integrated Quality Control sessions and a process to transform the data into a format usable by existing commercially available database, flowcharting, and word processing software tools.

The approach to Integrated Quality Control described here is being used successfully in IBM. IBM's GroupWare product, TeamFocus, is used in facilitated work sessions for Integrated Quality Control. TeamFocus is a GroupWare product that provides group decision support functions such as:
Electronic Brainstorming
Idea Organization
Voting
Topic Commenting
Alternative Evaluation
Group outlining
Group Matrix Following the facilitated sessions the resulting data is stored in a database tool such as Microsoft Access, thus making the data available for documentation. The documents are produced automatically by specialized bridge programs that use a word processor, such as IBM Book-Master. The documents are stored in another GroupWare tool for document management, such as LotusNotes.

The Integrated Quality Control methodology is used by a manufacturing organization to baseline its processes and systems. This baseline provides an objective assessment of the organization's quality with respect to:
process variables
product variables
gages or instrumentation
equipment
information and data IQC begins with documentation on existing process flows. Process variables, product variables, and gages are identified from the process flows. Specifications are documented for each variable and reaction plans are developed to document the steps taken when specifications are not met. Quality control plans are developed to indicate a variety of things such as ownership, recording and tracking mechanisms, procedures, and capability. The information in the quality control plans is used to build indices that result in a score for the organization. The score then becomes a baseline for quality improvements. All opportunities to improve quality are documented and tracked.

Groups of people from manufacturing, engineering, maintenance, and development work on the IQC deliverables as a team. These groups are known as "process improvement teams" and include a facilitator to help the meetings run smoothly. The facilitator is also responsible for documenting the team's results in the various IQC tables and forms and making this information available to the team members. GroupWare refers to computer applications that allow groups of people to work together through the sharing of information. Most GroupWare products provide one or more of the following functions:
Calendar
Electronic Mail
Word Processing
Data or Document Management
Group Decision Support
Work Flow Support GroupWare products all run on a network, so that information is easily shared and accessible to all users who need it. LotusNotes is a GroupWare product that provides word processing and documentation management functions. TeamFocus is a GroupWare product that provides group decision support functions in an electronic meeting setting.

Scope Exercise

Referring to FIG. 1, the workgroup gathers in a joint meeting to provide input in response to questions provided by a facilitator, shown as a PC (2) in FIG. 1. The PC server (5), operating system (6) and applications (6) are also shown. The session can also include a projector (4) and screen (3) for viewing and a printer (7) for hardcopy output. Each workgroup member participates in the meeting via a PC (1) and the questions and answers may be selectively displayed on the screen or on each PC.

Referring to FIG. 7, the Scope Exercise begins with a definition of the process in the words of the team. The bounds of the process are set by identifying the beginning step and the ending step of the process. It is important that the team agree on these bounds, otherwise the team will spend time discussing things that are outside of the scope of the project. Next, the team identifies their customers and suppliers in a brainstorming exercise. A GroupWare tool such as TeamFocus is used for the brainstorming. This initial facilitated session takes the process improvement team through a series of exercises that are designed to give them a common understanding of the scope of the Integrated Quality Control project. It takes them through some basic definitions and brainstorming exercises that must be made to get started. The definitions and ideas come directly from the group, in their own words, and are stored. Their responses are organization-specific. FIG. 2 shows a sample output of the present invention relating to the scope exercise.

In TeamFocus Idea Organization or Group Outliner, each participant suggests customers and suppliers that they are aware of. The responses from the group are collected, reviewed, and consolidated into a list that everyone concurs with. Next, the team collects additional information about each customer and supplier, such as a definition of who or what they are, the process inputs that they provide (supplier), and the process outputs that they receive (customer). The TeamFocus session data is copied to diskette and loaded into a database tool such as Microsoft Access for storage and later retrieval. Hardcopy documentation may be generated from TeamFocus or from the database. The documentation can also be stored in a Group-Ware tool such as LotusNotes, a document management tool, for sharing the IQC Scope information across the organization.

Process Flow and Opportunities Exercise

The Process Flow and Opportunities Exercise identifies all the steps in the process and the sequence in which they are performed. Referring to FIG. 8, the Process Flow and Opportunities Exercise begins with a review of the definition of the process and its bounds. It is important that the team agree on these bounds, otherwise the team will spend time discussing things that are outside of the scope of the project. Next, the team identifies the process steps in a brainstorming exercise. A GroupWare tool such as TeamFocus is used for the brainstorming. In TeamFocus Idea Organization or Group Outliner, each participant suggests process steps that they are aware of. The responses from the group are collected, reviewed, consolidated into a list, and sequenced with concurrence from everyone in the group. Discussion then follows to determine the type of step, that is procedure, operation, transfer, delay, or data recording. The type is noted in TeamFocus in the comment section for each process step. Also noted in the comment section is other relevant information such as a description of the procedure followed, tools needed, parameters or specifications that apply, and average distance traveled or time required. The TeamFocus session data is copied to diskette and loaded into a database tool such as Microsoft Access for storage and later retrieval. The process documentation will identify the variables and specifications needed to develop the quality control plans and indices later on in the Integrated Quality Control process. Hardcopy documentation may be generated from TeamFocus or from the database. The documentation can also be stored in a GroupWare tool such as LotusNotes, which is a document management tool, for sharing the process flow information across the organization. FIG. 3 shows a sample output of the present invention relating to the process flow and opportunities exercise.

During the brainstorming exercise, it is quite natural for problems and opportunities to be brought to light. As they are identified, they need to be recorded for later discussion and analysis. A GroupWare tool such as TeamFocus is used for capturing these opportunities. In TeamFocus Idea Organization or Group Outliner, participants or the facilitator can identify opportunities. Any additional information about the opportunity is recorded in the comment section, such as date, owner, status, dependencies, resolution, and potential benefits. Alternatively, the opportunities is input directly into a database tool such as Microsoft Access by creating an input screen that prompts for the appropriate information. Hardcopy documentation of the opportunities may be generated from TeamFocus or from the database in a report format. The documentation can also be stored in a GroupWare tool such as LotusNotes, which is a document management tool, for sharing the opportunity information across the organization.

Quality Control Plan and Index Development Session

The Quality Control Plan and Index Development Exercise consolidates all the relevant data about the various manufacturing variables and provides a score or measurement of the organization's quality level. Referring to FIG. 9 the Quality Control Plan and Index Development Exercise begins with the identification of manufacturing variables—process variables, product variables—as well as quality measurements. If manufacturing equipment is part of the scope of the IQC project, components are identified for each type of equipment. This is usually performed in a brainstorming exercise, although some of the variables may already be identified in the process documentation. Each quality control plan (QCP) is developed as a separate exercise, so that the brainstorming is focused on one topic at a time. A GroupWare tool such as TeamFocus is used for the brainstorming. In TeamFocus Idea Organization or Group Outliner, each participant suggests variables that they are aware of, or quality measurements or equipment components, depending on which QCP is being developed. The responses from the group are collected, reviewed, and consolidated into a list with concurrence from everyone in the group. Discussion then follows to identify the additional information required for each variable. Alternatively, the team is subdivided into groups that each take a few of the variables. The additional data is captured in TeamFocus in the comment section for each variable. The additional information varies depending on the type of QCP. Refer to the sample quality control plans in FIGS. 4a–f for details on the additional data required. The TeamFocus session data is copied to diskette and loaded into a database tool such as Microsoft Access for storage and later retrieval. Hardcopy documentation may be generated from TeamFocus or from the database. A specialized bridge program is used to automatically create this documentation in a word processing tool. The documentation can also be stored in a GroupWare tool such as LotusNotes, which is a document management tool, for sharing the quality control plans across the organization. FIGS. 4a–f show a sample output of the present invention relating to the quality control plan exercise. FIGS. 5a–g show a sample output of the present invention relating to the index development exercise.

Once all of the quality control plans have been developed, the indices are developed. In a database or spreadsheet tool, each variable is evaluated against the various parameters in the index. For example, process variables are evaluated on their specification, their sampling, their means of control, their capability, and their reaction plans. Each parameter has several possible states. Process variable specifications, for example, may not exist or may be expressed as a point, range, or nominal value with tolerances. Similar states exist for the other parameters. Each state has an available point value assigned to it. The organizations score is calculated by dividing the number of variables in that state by the total number of variables and then multiplying by the available points. Points are calculated for each state of each parameter, and then totaled for an overall score on that index. The index document is developed in a word processor or as a report from the spreadsheet or database tool.

Reaction Plan Development Exercise

The Reaction Plan Development Exercise develops specific instructions for the line operators to follow when specifications are not met. Referring to FIG. 10, the Reaction Plan Development Exercise begins with the identification of manufacturing variables—process variables, product variables—as well as quality measurements. If manufacturing equipment is part of the scope of the IQC project, components are identified for each type of equipment. This is usually performed in a brainstorming exercise, although some of the variables may already be identified in the quality control plans. Each reaction plan (RP) is developed as a separate exercise, so that the brainstorming is focused on one topic at a time. A GroupWare tool such as TeamFocus is used for the brainstorming. In TeamFocus Idea Organization or Group Outliner, each participant suggests variables that they are aware of, or quality measurements or equipment components, depending on which RP is being developed. The responses from the group are collected, reviewed, and consolidated into a list with concurrence from everyone in the group. Discussion then follows to identify the additional information required for each variable. Alternatively, the team is subdivided into groups that each take a few of the variables. For reaction plans, this includes the specification, the means of detection, and the specific instructions. The instructions should address both exceeding the upper limit and lower limit of the specification for the variable, when the required action is different. The additional data is captured in TeamFocus in the comment section for each variable. The TeamFocus session data is copied to diskette and loaded into a database tool such as Microsoft Access for storage and later retrieval. Hardcopy documentation may be generated from TeamFocus or from the database. A specialized bridge program is used to automatically create this documentation in a word processing tool. FIG. 6 shows a sample output of the present invention relating to the reaction plan development exercise. The documentation can also be stored in a GroupWare tool such as LotusNotes, which is a document management tool, for sharing the reaction plans across the organization.

Bridge Programs

The TeamFocus sessions produce data files comprised of all the groups' responses to the facilitator's prompts for information. Upon execution of the bridge programs these files are formatted into import files for various tools. Also, the files can be formatted into printed documents, such as process documents, opportunity tables, QCPs, and RPs automatically.

Referring to FIG. 11 showing a pseudocode implementation of the bridge program EXPORT, this specialized program used by IBM bridges data from a TeamFocus Idea Organization (IO) session to a DBASE III database file. The program begins with a prompt to the user to enter the path to the SESSION.DBF file created by TeamFocus. The program then verifies that the path entered is correct, and if so, reads the file to determine the names of all available sessions. These are entered into a list box control on the main form. The default source and destination paths are set as the current directory. They are changed by the user if need be. The user can select as many sessions as desired to be exported. When OK is clicked, the EXPORT program validates all data fields entered by the user. If all is valid, the Session Id for the first selected session is used to determine input file names. The file containing all the IO list items and their associated comment file names is named "LIST_x.IO" where x is the Session Id. The first LIST_x.IO record is read and assigned to the Idea field. The next line is then read and assigned to the Comment File Name variable. This represents the name of the file that contains any comments associated with that Idea. If the Comment File exists, then each line of the file is read and appended to the Comment field. Session Id, Idea, and Comment are then written to the DBase III database file. This process of reading and processing 2 LIST_x.IO lines at a time is then repeated until the file is empty.

IQC Bridge

Figure 12A:
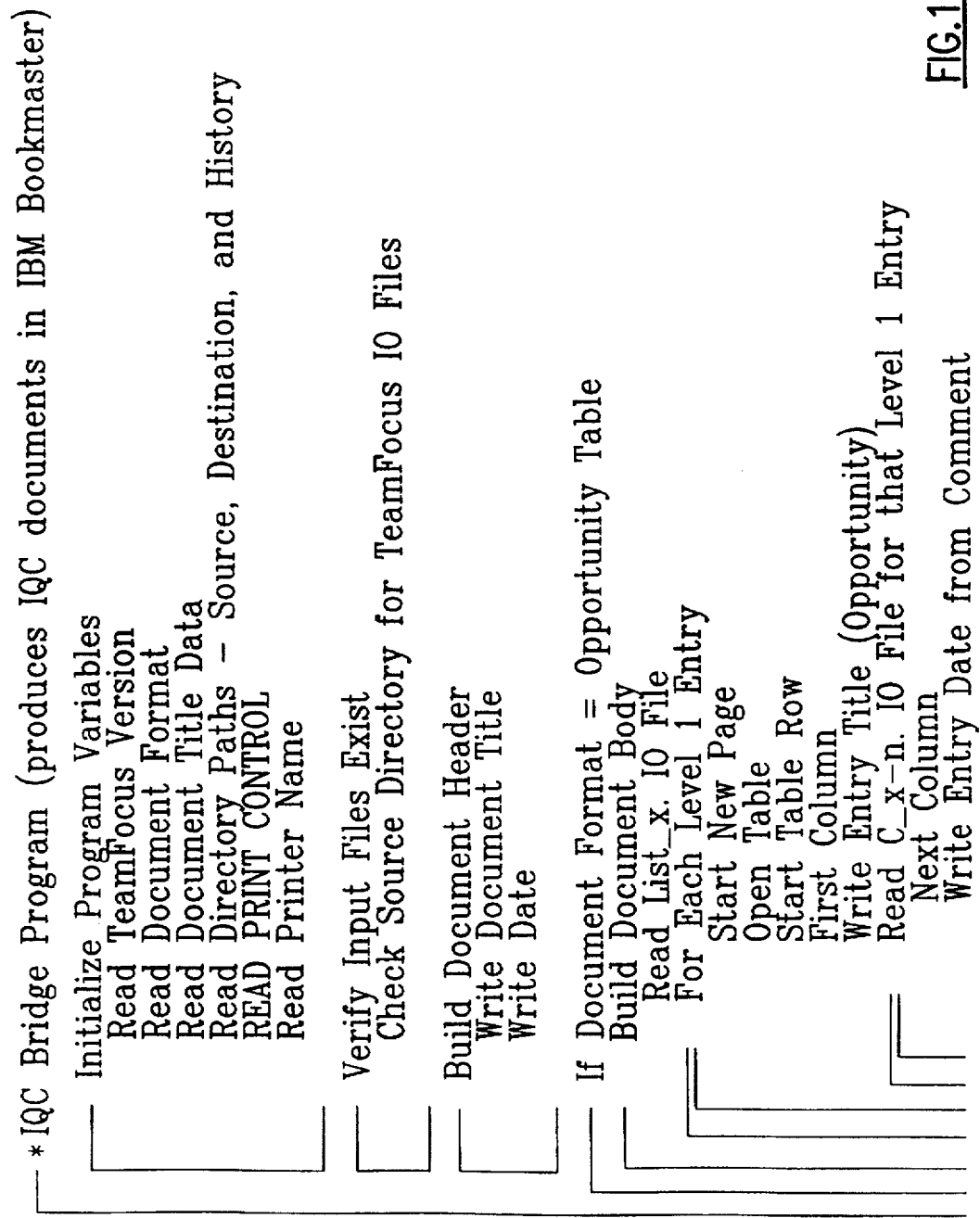
FIG. 12 is a pseudocode implementation of the IQC bridge program.
Figure 12B:
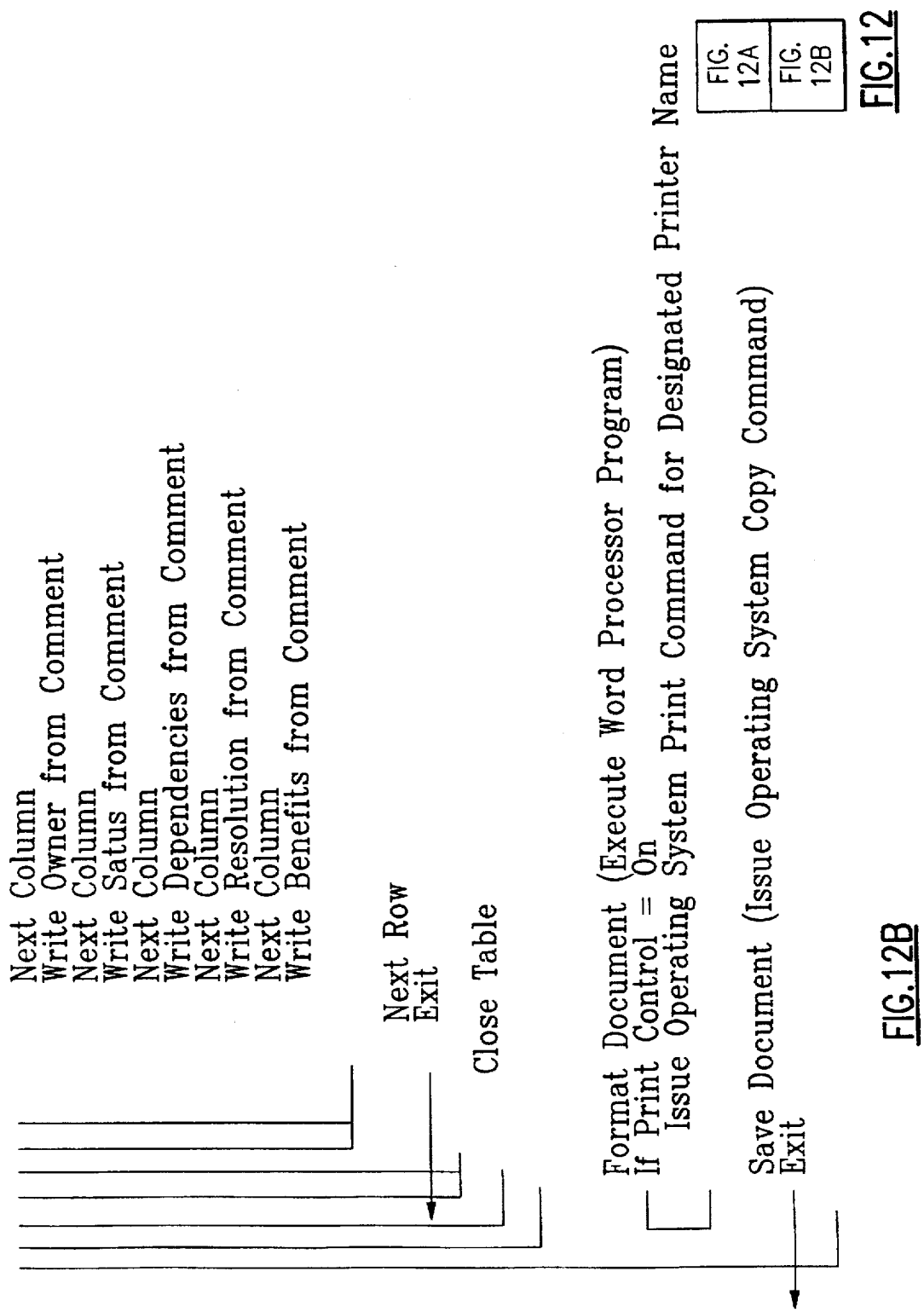
Figure 13A:
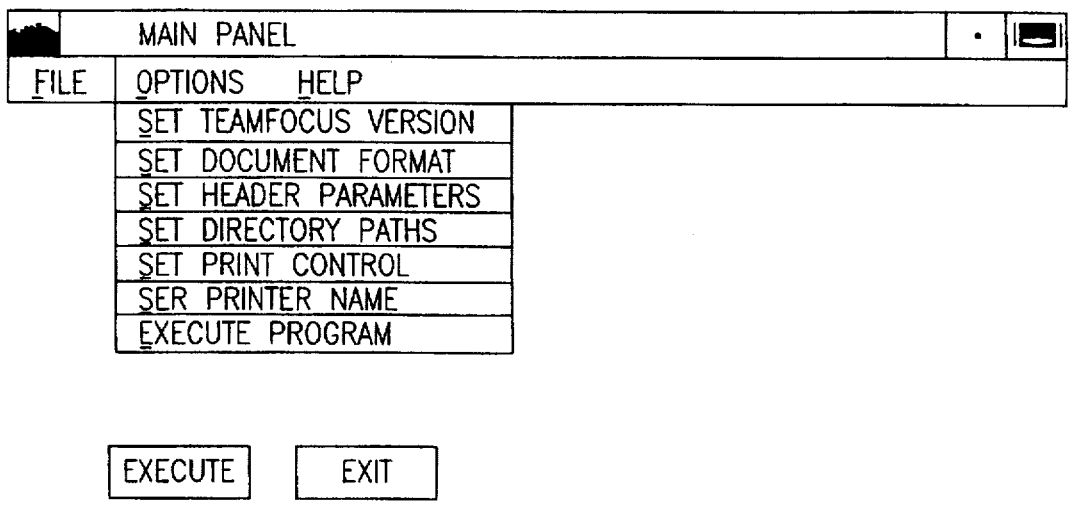
FIGS. 13a-g are sample screens from the IQC bridge program user interface.
Figure 13B:
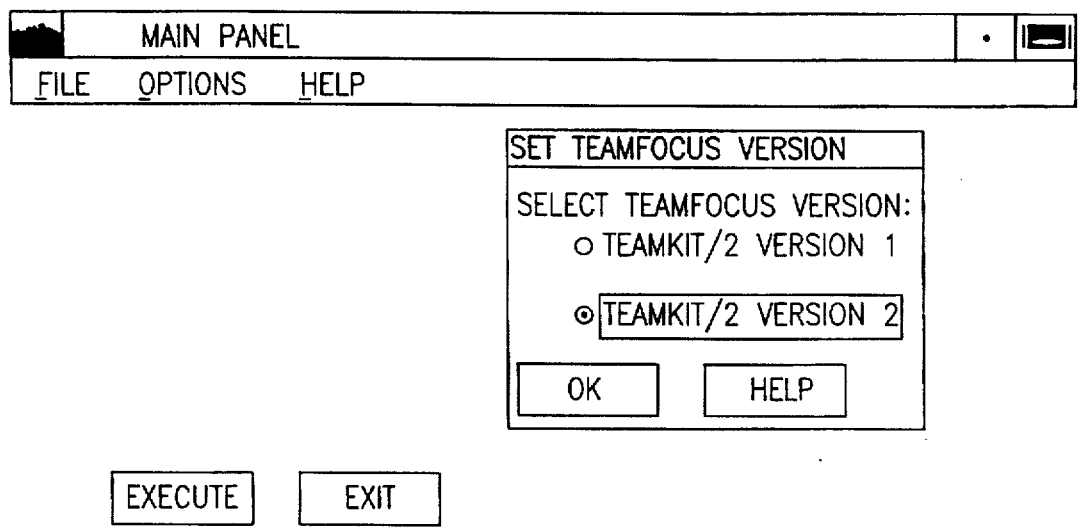
Figure 13C:
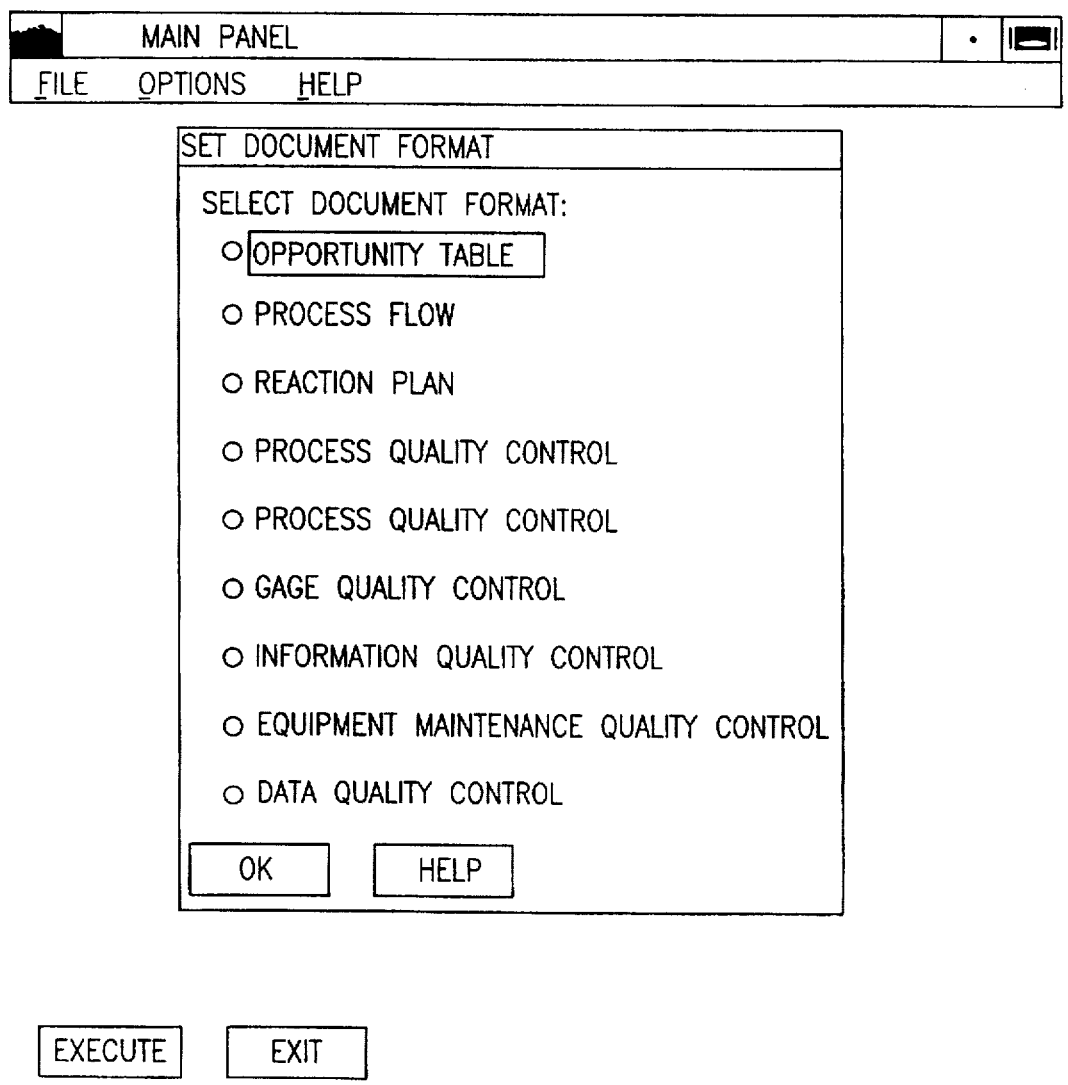
Figure 13D:
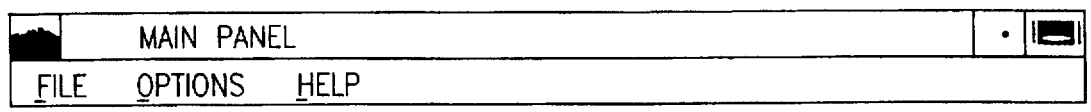
Figure 13E:
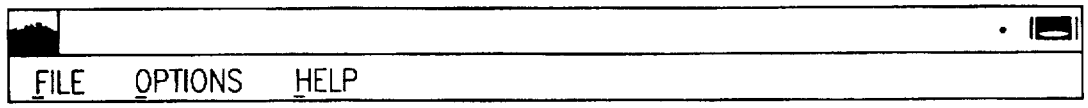
Figure 13F:
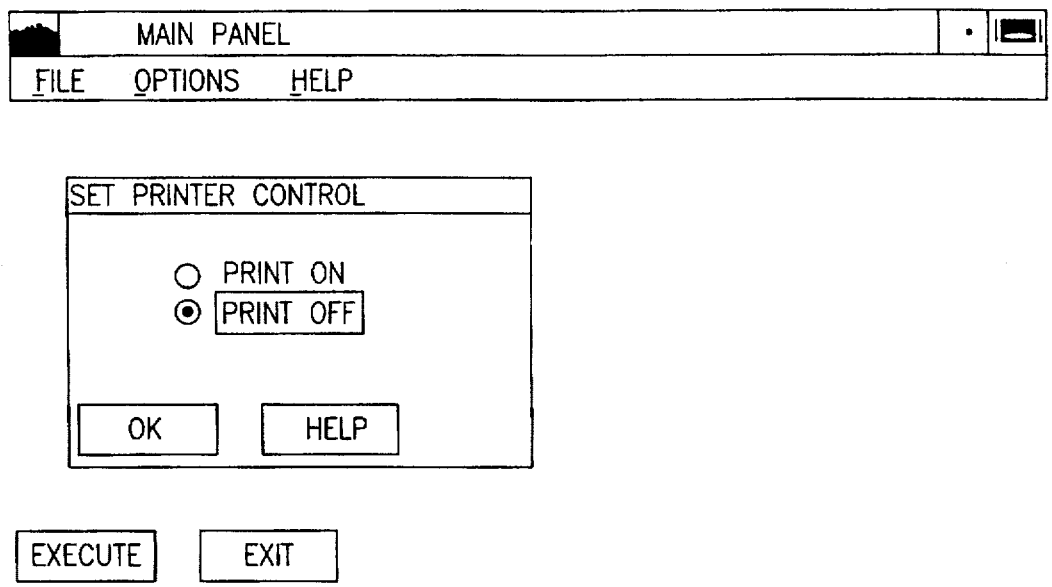
Figure 13G:
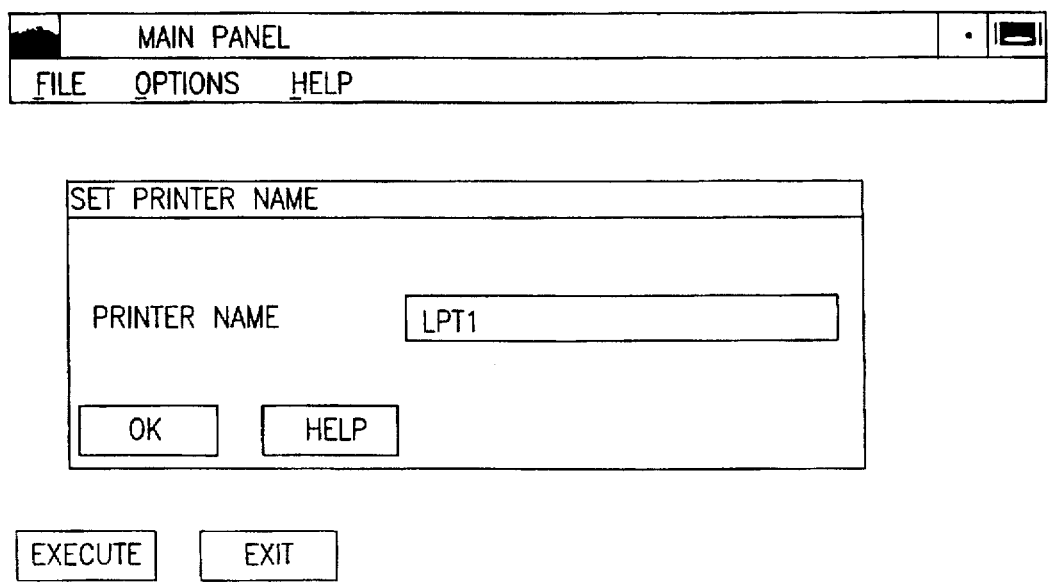

Referring to FIG. 12 showing a pseudocode implementation of the bridge program IQC, this specialized program used by IBM bridges data from a TeamFocus Idea Organization (IO) session to an IBM Bookmaster file that produces the documentation from IQC sessions. The program begins by reading in the values set by the user in the Options pull-down menu, as shown in the sample screens in FIGS. 13a–g. These include:
TeamFocus Version
Document Format
Header Parameters
Directory Paths
Print Control
Printer Name The TeamFocus version is needed in order to properly access the TeamFocus data as the file structures vary from release to release. The document format indicates which type of IQC document is to be produced. Header parameters allow for customized titles for the IQC documents. The directory paths establish the source directory where the TeamFocus data is found and the destination directory where the Bookmaster file is written. Print Control determines whether or not to route the document to a printer. The printer name is needed if Print Control is turned on. Next the program verifies that all of the input files exist. Then it sets up the page header information by writing out the document title and date. At this point, the program begins to construct the body of the document, which is a Bookmaster table. It reads the LIST_x.IO file to determine the Level 1 entries and their corresponding comment file. It opens the table, starts the first row, and reads the C_x-n.IO comment file for the first Level 1 entry. Each field of information in the comment file becomes a column in the table. The various fields of information in the comment files are distinguished either by tags or by skipping a line. Each type of IQC document has a different set of information required, so the tables vary by the type of IQC document. (Reference the sample IQC documents in FIGS. 2–6). When all of the fields are written for that particular Level 1 entry, the program begins a new row and reads the comment file for the next Level 1 entry. This continues for each Level 1 entry. When all Level 1 entries have been processed, the table is closed and the output file is closed. The program executes the word processor program that formats the output file with its Bookmaster commands in a document. If print control is turned on, the appropriate print command is executed to send the document to the designated printer. The output file is copied to the destination directory and the program ends.

Advantages over the Prior Art

The combination of facilitated work sessions and GroupWare products, when applied to the Integrated Quality Control methodology, allows an organization to assess its manufacturing operations in less time than it would otherwise have required. The facilitated work sessions allow the "process improvement teams" to focus their efforts and make effective use of their time. They also promote teamwork and ownership of procedures and opportunities. The GroupWare tools allow the work team to quickly collect, organize, and document their ideas. At the end of the facilitated session, the team has immediate documentation of their work. The GroupWare tools also allow for the proper management of the documentation, making immediate access throughout the organization possible. Although Integrated Quality Control was developed specifically to study and improve manufacturing operations, these methods need not be limited to physical production of goods. A medical office or hospital emergency room, for example, consists of inputs, processes performed by people or machines, and outputs. Medical services can be analyzed and improved using the Integrated Quality Control methodology. The only difference would be that the session teams will use different terms to describe similar problems such as "How long does it take?", "How many can we handle in a day?", and "How long will they have to wait?"

GroupWare tools can help overcome some of the risks of the manual methods for Integrated Quality Control mentioned above. Team members can submit ideas anonymously, so that people uncomfortable speaking out in a group can share their ideas. Also, since ideas are submitted electronically via computer keyboard, nothing is forgotten or incorrectly recorded. Some time is saved, since all team members can type their ideas simultaneously. Finally, and probably most importantly, GroupWare helps the process improvement teams reach a consensus more rapidly than manual methods, because everyone has a voice and everyone has a vote.

Alternative Embodiments

It will be appreciated that, although specific embodiments of the invention have been described herein for purposes of illustration, various modifications may be made without departing from the spirit and scope of the invention. In particular, other bridge programs can similarly be written for various analysis tools chosen by the IQC team. Other tools might include spreadsheet or flowcharting tools. The advantages offered by the bridge programs are in time saving and accuracy, as the data need not by manually keyed into each tool. Accordingly, the scope of protection of this invention is limited only by the following claims and their equivalents.

We claim:

1. A method for establishing and documenting a quality control plan for production or service processes, comprising the steps of:

providing a group decision support environment for a plurality of participants, the environment including a network of a multitude of computer interface stations, each station including input means and a display means;

simultaneously soliciting from a plurality of the participants information concerning presently existing or desired processes;

simultaneously inputting into a plurality of the computer stations data representing the information concerning presently existing or desired processes, by a plurality of the participants;

storing the data concerning presently existing or desired processes in the network;

simultaneously soliciting from a plurality of the participants information concerning variables affecting quality of the presently existing or desired processes;

simultaneously inputting into a plurality of the workstations data representing the information concerning variables affecting quality of the presently existing or desired processes, by a plurality of the participants;

storing the data concerning variables affecting quality of the presently existing or desired process in the network;

formatting stored data representing the information concerning processes and the variables affecting quality in a format suitable for use by a selected database tool:

executing a selected bridge program for retrieving the formatted data from the database tool: and automatically retrieving from network storage information contained in the computer network, outlining the quality control plan for manuals containing the information that was input by a plurality of the participants concerning presently existing or desired processes and variables affecting quality of the presently existing or desired processes.

2. The method according to claim 1 wherein the participants include personnel responsible for an implementation of the actual and desired manufacturing processes.

3. The method according to claim 1, further including the steps of:

simultaneously soliciting from a plurality of the participants, information concerning variables affecting quality of presently existing or desired process outputs;

simultaneously inputting into a plurality of the workstation information concerning variables affecting quality of the presently existing or desired process outputs by a plurality of the participants; and storing the variables affecting quality of the presently existing or desired process outputs.

4. The method according to claim 1, further including the steps of:

simultaneously inputting into a plurality of the workstations values representing baseline indices derived from the information concerning variables affecting quality of the presently existing or desired processes by a plurality of the participants;

simultaneously inputting into a plurality of the workstations values representing target indices derived from the information concerning variables affecting quality of the existing or desired processes by a plurality of the participants; and storing the values representing target indices, in the network.

5. The method according to claim 4, further including the steps of:

simultaneously soliciting from a plurality of the participants information concerning possible states and associated values of the variables affecting quality of presently existing or desired processes; and simultaneously inputting into a plurality of the workstations the possible states and associated values of the variables affecting quality of presently existing or desired processes by a plurality of the participants.

6. The method according to claim 5, further including the steps of:

executing export programs for formatting the data stored in the computer system, the format compatible for use by the selected bridge program;

the bridge program automatically reformatting the retrieved data into predefined formats suitable for efficient interfunctional organization use, the predefined formats including predefined chapter and page headings; and the bridge program automatically printing the data in a form of manuals suitable for use by the personnel responsible for an implementation of the actual and desired manufacturing processes.

7. The method according to claim 6, wherein the selected database tool includes an export program for use by the bridge program to retrieve the formatted data.

8. The method according to claim 6, wherein the bridge program includes an import tool to retrieve the formatted data from the database tool.

* * * * *